United States Patent
Berkowitz

[15] 3,671,006
[45] June 20, 1972

[54] REFRIGERATOR WALL PANELS WITH PANEL FASTENERS AND APPARATUS FOR MAKING SAID PANELS

[72] Inventor: Irving L. Berkowitz, Binghamton, N.Y.
[73] Assignee: Kason Hardware Corporation, Binghamton, N.Y.
[22] Filed: July 1, 1970
[21] Appl. No.: 51,635

[52] U.S. Cl. ...........................249/97, 287/20.924, 52/499
[51] Int. Cl. .......................................................B22d 19/04
[58] Field of Search...................249/205, 216, 217, 219, 47, 249/94, 166, 167; 287/20, 924, 20.925; 52/499, 500, 485, 584, 585

[56] References Cited

UNITED STATES PATENTS 3,341,233   9/1967   Cushman..............................52/584 X
3,565,469   1/1971   Zwart....................................52/584 X Primary Examiner—David J. Williamowsky
Assistant Examiner—Wayne L. Shedd
Attorney—J. B. Felshin

[57] ABSTRACT

The panels are molded. Frame members for the edges of the panel are assembled with thin, parallel spaced side walls, and with complementary panel, hook and pin fastener members in registry with appropriate openings or slots in the frame members, ro form the molds for the panels. Fixtures are provided to properly align each panel hook fastener member molded into one panel with a complementary panel pin fastener member molded into another panel fastener. These fixtures cut down the time necessary for positioning the panel fastener members preparatory to molding, and to ensure proper positioning of the fasteners in correct positions so that each hook fastener member matches exactly with a complementary pin fastener member.

20 Claims, 10 Drawing Figures

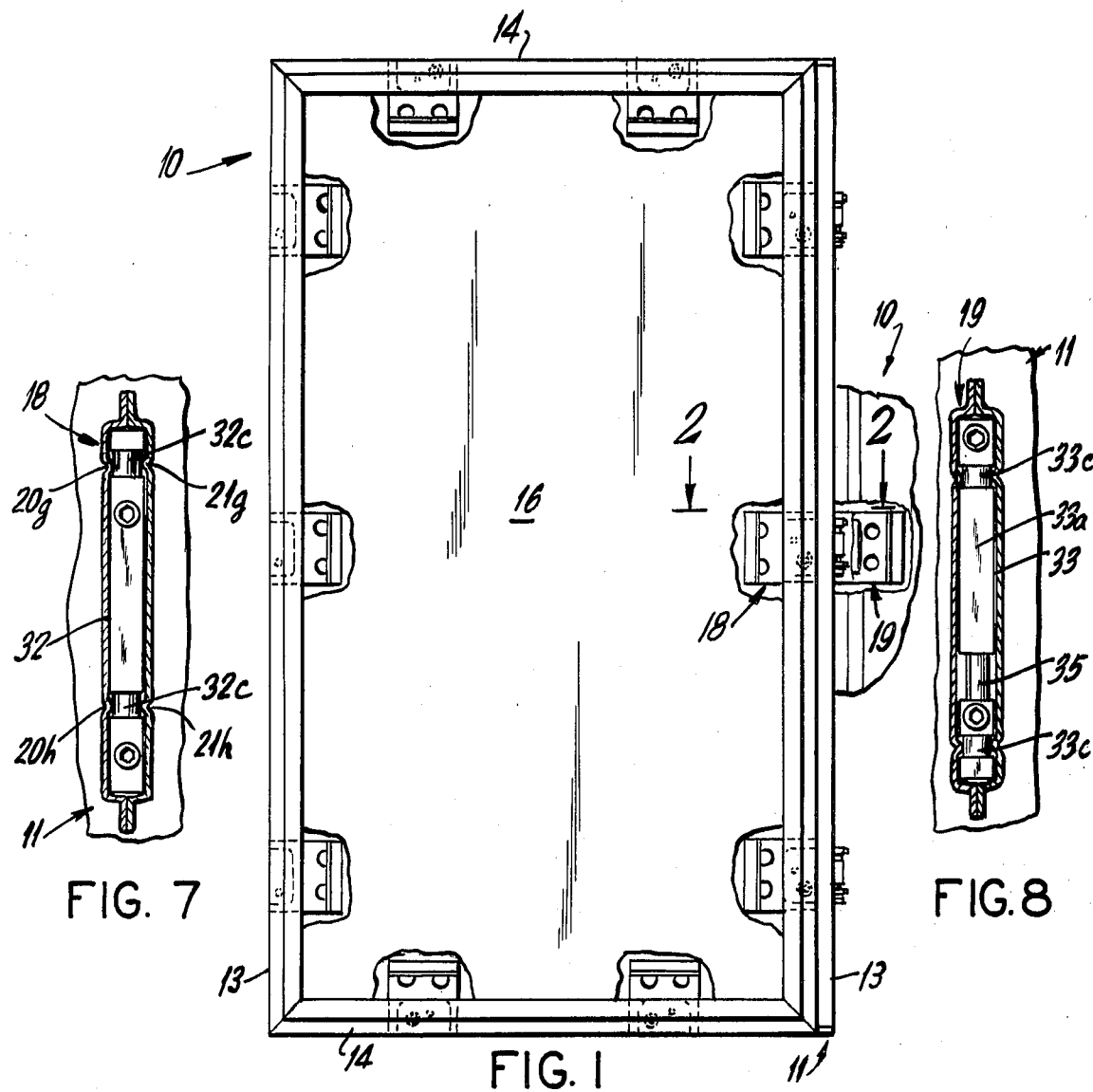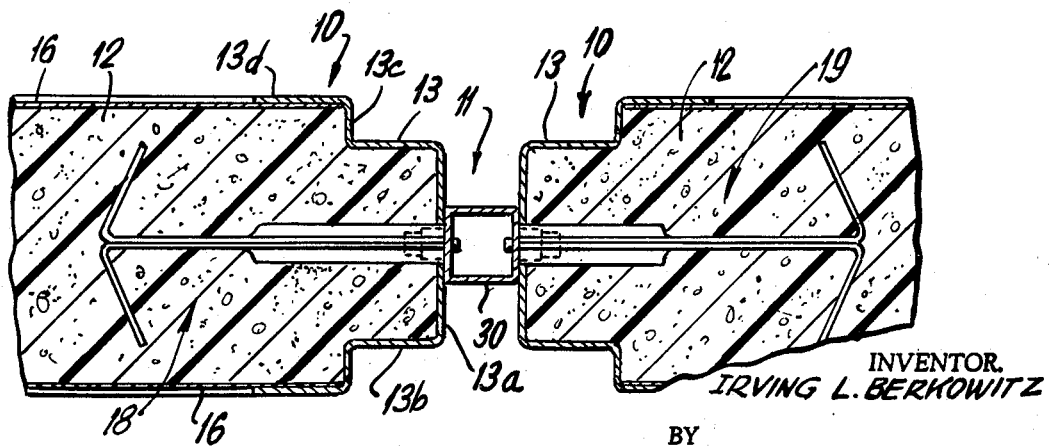

INVENTOR.
IRVING L. BERKOWITZ
BY
J.B. Felshin
ATTORNEY

REFRIGERATOR WALL PANELS WITH PANEL FASTENERS AND APPARATUS FOR MAKING SAID PANELS

This invention relates to molded refrigerator wall panels with complementary panel fasteners molded therein, and to apparatus for making the panels.

An object of this invention is to provide a fixture on which are mounted spaced pairs of opposed inserts, one to enter a hook fastener and one to enter a pin fastener during molding of the panel, to ensure that these fasteners are properly aligned for interaction when the panel has been molded.

Another object of this invention is to provide fixtures of the character described in which one insert is only insertible in one position into a panel hook fastener and the opposed insert is only insertible in one position into a panel pin fastener, to make sure that each hook fastener is exactly matched up with a pin fastener for proper cooperation therewith.

Still another object of this invention is to provide fixtures which carry a plurality of sets of opposed complementary inserts, to facilitate molding of the panels.

Yet another object of this invention is to provide fixtures of the character described in which the inserts are removably attachable to opposed sides of a rectangular rod or tube, and said inserts having means to snap into the casings of the fasteners.

A further object of this invention is to provide highly improved fastener members having means to keep the molding material out of the casing portions of the fasteners that house the hook members and the pins which are to be engaged by the hook members.

A still further object of this invention is to provide highly improved mold apparatus that can readily be disassembled after the molding operation and reused to mold the panels.

Yet a further object of this invention is to provide inserts for the fixtures which match with the hook and pin fastener members in such a way as to ensure that the fasteners can be molded only in correct complementary matching positions.

A yet further object of this invention is to provide strong, rugged and durable mold apparatus for molding panels with panel fasteners and to provide highly improved panels made with such apparatus, economically, rapidly and efficiently.

Other objects of this invention will in part be obvious and in part hereinafter pointed out.

The invention accordingly consists in the features of construction, combinations of elements, steps in a process and arrangement of parts which will be exemplified in the construction hereinafter described, and of which the scope of invention will be indicated in the following claims.

In the drawing:

FIG. 1 is a front view of a molded panel in a mold apparatus embodying the invention, with parts of complementary fasteners and inserts for an adjacent panels;

FIG. 2 is an enlarged cross-sectional view taken on line 2—2 of FIG. 1;

FIG. 7 is a cross-sectional view taken on line 7—7 of FIG. 3;

FIG. 8 is a cross-sectional view taken on line 8—8 of FIG. 3;

Figure 3:
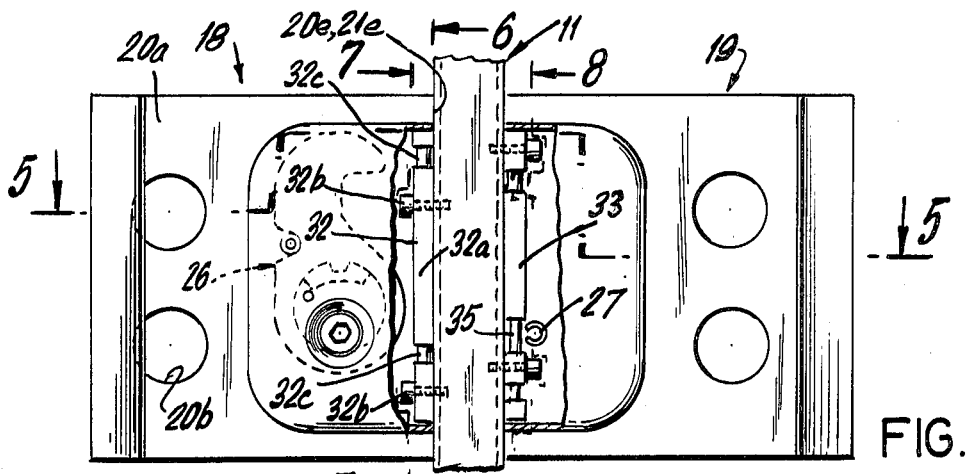
FIG. 3 is a side elevational view of a portion of a mold fixture with a pair of complementary hook and pin fastener members thereon.
Figure 5:
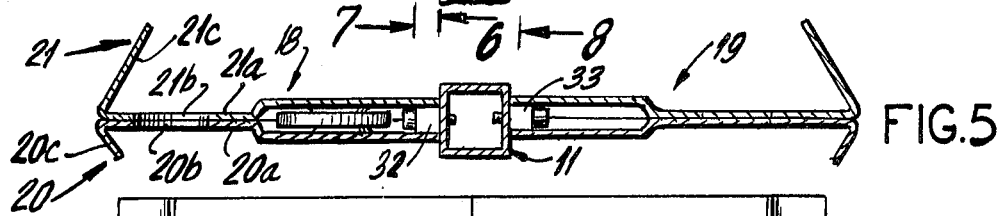
FIG. 5 is a cross-sectional view taken one line 5—5 of FIG. 3.
Figure 4:
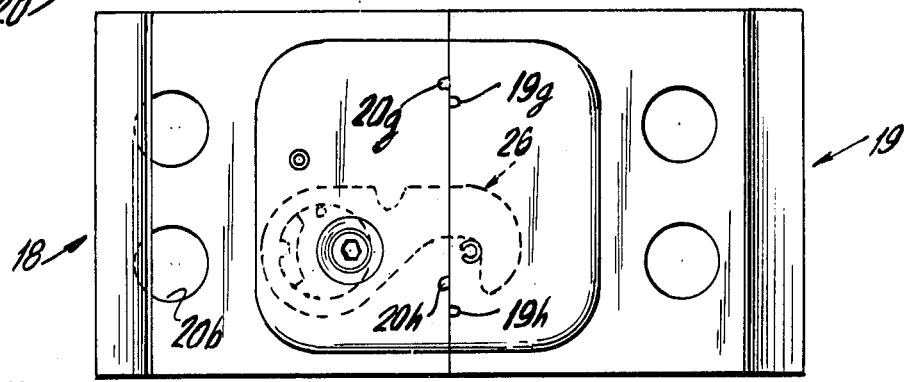
FIG. 4 is a side view of the complementary fastener members with the fixture of FIG. 3 removed, and drawn together.
Figure 6:
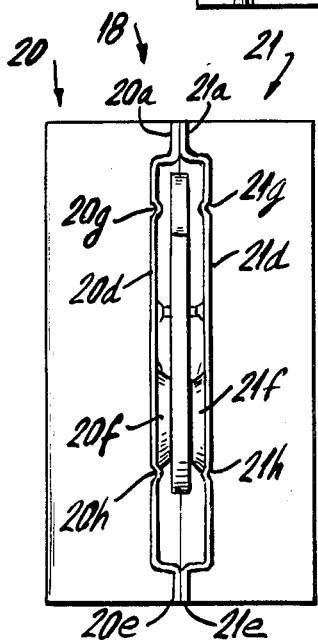
FIG. 6 is a cross-sectional view taken on line 6—6 of FIG. 3.
Figure 9:
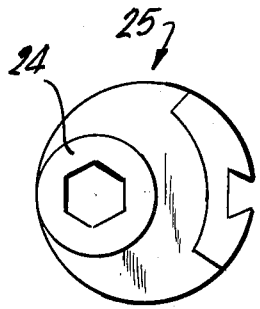
FIG. 9 is a side view of the hook cam for the hook of the hook fastener member.
Figure 10:
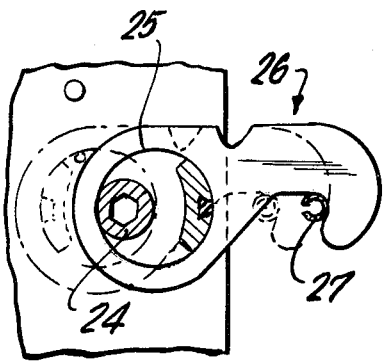
FIG. 10 is a cross-sectional view of the cam illustrating the movement of the hook upon rotating the hook cam to draw the hook and pin fasteners together for attaching panels together.

Referring now in detail to the drawing, 10 designates a panel mold with part of an adjacent panel mold 10, with a fixture 11 therebetween. In the panel molds are molded panels 12 which may comprise poly urethane. Each panel mold 10 comprises a pair of symmetrical vertical frame members 13 mitered at their upper and lower ends to symmetrical top and bottom horizontal frame members 14.

Frame members 13 have outer vertical webs 13a from which extend parallel walls 13b, from which extend aligned, coplanar walls 13c, from which extend parallel flanges 13d. Contacting the flanges 13d are parallel spaced rectangular walls 16 to close the mold.

Webs 13a have slots or openings 17 to receive vertical end edge portions of panel hook fasteners 18 or panel pin fasteners 19. Each hook fastener 18 of one panel must match up with a pin fastener of a next adjacent panel. In the panel mold 10 of FIG. 1, there may be three hook fasteners on the right side to match up with pin fasteners on the left side of an adjacent panel, three pin fasteners on the left side to match up with hook fasteners on an adjacent panel, while at the top and bottom there may be two hook fasteners to match with pin fasteners at the bottom of one panel and with two pin fasteners at the top of another adjacent fastener.

Each hook fastener 18 comprises a pair of symmetrical, stamped sheet metal parts 20, 21 having mutually contacting walls 20a, 21a. Walls 20a, 21a are formed with registering openings 20b, 21b and bent back wings 20c, 21c. Extending from walls 20a, 21a are outwardly recessed parallel, spaced walls 20d, 21d terminating short of the upper and lower edges of said walls 20a, 21a but extending to the inner vertical edges 20e, 21e of said walls. These walls 20d, 21d form a casing to house a hook as explained later.

Walls 20d, 21d are formed with annular bearings 20f, 21f receiving oppositely extending hubs 24 of a cam 25 such as shown in my U.S. Pat. No. 3,472,545 granted Oct. 14, 1969. On said cam is a hook member 26. The operation of the hook member is described in my said U.S. Pat. No. 3,472,545.

Walls 20a, 21a are welded together.

The pin fastener 19 is much like the hook fastener 18 and symmetrically disposed thereto. However it has no cam 25 or hook 26, but it does have a transverse pin 27 to be engaged by the hook 26 of the hook fastener. Upon molded panels being placed together, edge to edge, rotation of a cam 25 by means of a wrench will pull adjacent panels together and lock them, in the manner explained in my said patent.

It is of great importance that each hook fastener be correctly and exactly matched up with its corresponding pin fastener. Means is provided to do this during molding of the panels. To this end said fixture 11 is provided, so that after one panel is molded an adjacent panel can be molded with will correctly fasten thereto.

It will be noted that walls 20d, 21d of hook fastener 18 have two opposed indentations 20g, 21g near the upper ends of said walls and at the edges 20e, 21e, and also a pair of similar opposed indentations 20h, 21h spaced above the lower ends of said walls, a greater distance than indentations, 20g, 21g are spaced below the upper ends of said walls. The purpose of such construction will be explained hereinafter.

The corresponding walls or casing of pin fastener 19 have indentations 19g and 19h. Indentations 19g are spaced below indentations 20g, 21g and indentations 19h are spaced below the indentations 20h, 21h. The distances of indentations 19g, 19h from the ends of the casing of pin fastener 19 are different from the distances of indentations 20g, 21g and 20h, 21h from the ends of the casing of fastener 18.

Fixture 11 comprises a hollow straight tubular rod 30 of square cross-section which may run the length of the panel mold and may carry three sets of matching opposed inserts 32, 33. The inserts 32 are for insertion into the casings of hook fasteners 18, while the inserts 33 are for insertion into the casing of pin fasteners 19.

Each insert 32 comprises a rod 32a of rectangular cross-section screwed into a wall of tube 30 by means of a pair of socket head screws 32b. Said rod 32a has a pair of oppositely rounded intermediate portions 32c, to wedge between and past the indentations 20g, 21g and 20h, 21h of fastener 18, thereby bringing the end edges 20e, 21e of the fastener against a surface of the tube 30 and closing the hollow casing formed by the outwardly recessed walls 20d, 21d. Thus, the reduced, rounded rod portions 32c must be so located that as the insert 32 enters between the walls 20d, 21d, said rounded portions will be at the levels of the indentations 20g, 21g and 20h, 21h.

The hook 26 can be swung up into the casing of fastener 18, between walls 20d, 21d thereof, by rotating the cam 25 counter-clockwise to the position of FIG. 3, and then swinging the hook upwardly counter-clockwise, to said FIG. 3 position, so that said hook will be fully housed in the fastener 18 and allow insertion of insert 32 into the casing of said fastener.

The insert 33 is the same as insert 32 and symmetrically disposed with respect thereto. However its rod 33a has rounded rod portions 33c which are aligned with the indentations of the casing of pin fastener 19. Since the indentations 20g, 21g and 20h, 21h are at levels different than the levels of indentations 19g, 19h, and since the length of the inserts 32, 33 is just sufficient to enter the fastener casing portions, it will not be possible for a hook fastener to receive an insert 33 or for a pin fastener to receive an insert 32.

Poly urethane or other molding material may be poured into the molds through one or more suitable openings in the panel mold walls 16. The mold material cannot enter the casings or housings of the fasteners 18 or 19 during the molding operations because said casings are closed. After a panel is molded the frame members 13, 14 may be disassembled from the walls 16. One panel can be molded at a time.

The screws 32b are equally spaced apart so that the inserts are interchangeable.

Fixtures like fixture 11 of appropriate length may be used at the top and bottom, but these could be shorter and have only two sets of inserts. Of course the panels can be longer or shorter, top to bottom or from side to side, and the fixtures are made to suit required lengths and required members of sets of inserts.

The side surfaces of the rods 32a fit snugly against the inner surfaces of the side walls 20d.

Rod 33a of insert 33 may have a reduced intermediate round central shaft portion 35 to clear the pin 27 of the pin fastener.

When the inserts 32, 33 are received in the fasteners 18, 19 the fasteners are not movable longitudinally relative to the inserts because the indentations fit snugly between the shoulders formed at opposite sides of the rounded portions on the rectangular portions of the rods. Also the notches prevent the inserts from accidentally pulling out because the distance between opposed indentations is somewhat smaller than the diameters of the rounded portions of the insert rods.

It will be observed that the hook fastener 18 can receive the insert 32 only in one position. If the fastener were turned around rounded parts 32c could not fit in between the indentations 20g, 21g and 20h, 21h. The same is true of pin fastener 19. Thus if the inserts are correctly mounted on tube 30, insert 32 can only be received in panel fastener 18, and only in correct direction, and when that is done, only panel fastener 19 can be mounted on the other insert and only in correct direction. Although the lengths of the inserts are the same, and the vertical heights of the casings 20d, 21d of fastener 18 and the casing of the fastener 19 are similar, the spacing of portions 32c and 33c are dissimilar and the spacing of the indentations of said casing are dissimilar. Thus the casing of the hook fastener can receive only the insert 32 in only one relative position, and the casing of the pin fastener can receive only the insert 33 in only one relative position. Hence fastener 18 cannot receive the insert 33 in any position, and fastener 19 cannot receive the insert 32 in any position.

A pin of hexagonal cross-section can be inserted through the hexagonal wrench hole and such pin may extend to one wall 16, to mold a hex hole for a wrench.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

What is claimed is:

1. A fixture comprising an elongated member having opposed parallel surfaces, a pair of opposed inserts at said opposed surfaces, a panel hook fastener comprising a casing having an opening at one end and receiving one of said inserts in its open end, a panel pin fastener comprising a casing having an opening at one end and receiving the other of said inserts therein, said panel hook fastener having a hook engageable with a pin on the panel pin fastener when the elongated member and inserts are removed from said fasteners.

2. The combination of claim 1, said inserts and panel fasteners having cooperating means to permit only one of said inserts to be received in the opening of the casing of the panel hook fastener, and to permit only the other of said inserts to be received in the opening of the casing of the panel pin fastener.

3. The combination of claim 2, with only one end of each insert at only one end of the opening of the casing in which it is received.

4. The combination of claim 1, said inserts being substantially coextensive with the openings in which they are received, and engaging the inner surfaces of said casings, respectively.

5. The combination of claim 3, said cooperating means comprising upper and lower pairs of indentations formed at the open ends of said casings, and upper and lower rounded portions spaced on said pair of inserts to snap in between and past said pairs of indentations of said casings, respectively.

6. The combination of claim 5, said inserts being of rectangular cross-section.

7. The combination of claim 1, and panel molds having openings to receive the open ends of said casings.

8. The combination of claim 7, each mold comprising a rectangular frame and spaced side walls on said frame, said openings in the mold being formed in the frame of said mold.

9. The combination of claim 1, and means to removably attach said inserts to said elongated member.

10. The combination of claim 9, said elongated member comprising a tube of rectangular cross-section.

11. The combination of claim 10, said means to removably attach said inserts to said elongated member, comprising equally spaced screws on said inserts, equally spaced from the ends of said inserts, said inserts being of equal length.

12. The combination of claim 1, in which there are a plurality of spaced pairs of said opposed inserts on said elongated members and a plurality of pairs of said panel hook fasteners and panel pin fasteners receiving said inserts.

13. The combination of claim 12, said plurality of pairs of inserts being equally spaced apart.

14. The combination of claim 1, each fastener being made of two sheet metal pieces having mutually contacting fixed together portions, wings on said mutually contacting portions, and portions recessed outwardly from said mutually contacting portions, forming said casing of said fastener.

15. The combination of claim 14, said mutually contacting portions having registering openings for molded material to pass therethrough during the molding process.

16. A panel hook fastener comprising a panel hook casing provided with opposed parallel walls having parallel coextensive edges and forming an elongated opening therebetween, at one side of the casing, a panel hook, means to mount said hook in said casing for rotary movement about its axis and for movement in a direction at right angles to said edges, and locating means on said casing and at said opening, and between said walls, and a panel pin casing uninterchangeable with the panel hook casing and provided with opposed parallel walls having parallel coextensive edges and forming an elongated opening at one side of said panel pin casing and adapted to register with the opening in the panel hook casing, a pin interconnecting the opposed walls of said panel pin casing and adapted to be engaged by said hook, and locating means on said panel pin casing, at the opening of said panel pin casing, and between the walls thereof, the middle of the locating means on said panel pin casing being offset from the middle of the locating means on the panel hook casing, longitudinally of said openings, said casings being unidentical.

17. The combination of claim 16, said locating means on said panel hook casing comprising upper and lower pairs of aligned indentations at the edges of said walls of said casing, the pairs of indentations on the opposed walls of said panel hook casing being offset from the pairs of indentations on the walls of said panel pin casing, respectively, and the distance separating the pairs of indentations on the walls of the panel hook casing being equal to the distance separating the pairs of indentations on said panel pin casing.

18. The combination of claim 16, first insert means received in said opening of said panel hook casing and having locating means cooperating with the locating means on said panel hook casing to allow insertion of the first insert means therein, second insert means received in said opening in said panel pin casing and provided with locating means longitudinally offset from the locating means of said first insert means and cooperating with the locating means of said panel pin casing to allow insertion of said second insert means therein, and means to fix the first and second insert means together.

19. The combination of claim 18, said cooperating locating means on said panel hook casing and on said first insert means including means to hold said panel hook casing together with said first insert means, and said cooperating locating means on said panel pin casing and on said second insert means including means to hold said panel pin casing and said second insert, together.

20. The combination of claim 18, said indentations of said panel hook casing and panel pin casing, being similar in shape.

* * * * *

UNITED STATES PATENT AND TRADEMARK OFFICE
Certificate

Patent No. 3,671,006                        Patented June 20, 1972

Irving L. Berkowitz

Application having been made by Irving L. Berkowitz, the named inventor in the patent above identified and Kason Hardware Corporation, Binghamton, N.Y., a corporation of New York, the assignee, for the issuance of a certificate under the provisions of Title 35, Section 256, of the United States Code, adding the name of Herbert Ahrendt as a joint inventor, and a showing and proof of facts satisfying the requirements of the said section having been submitted, it is this 30th day of September 1975, certified that the name of the said Herbert Ahrendt is hereby added to the said patent as a joint inventor with the said Irving L. Berkowitz.

FRED W. SHERLING,
*Associate Solicitor.*